Aug. 11, 1942.  T. R. HARRISON  2,292,937
TIME TEMPERATURE MEASURING INSTRUMENT
Filed Oct. 19, 1938  4 Sheets-Sheet 1
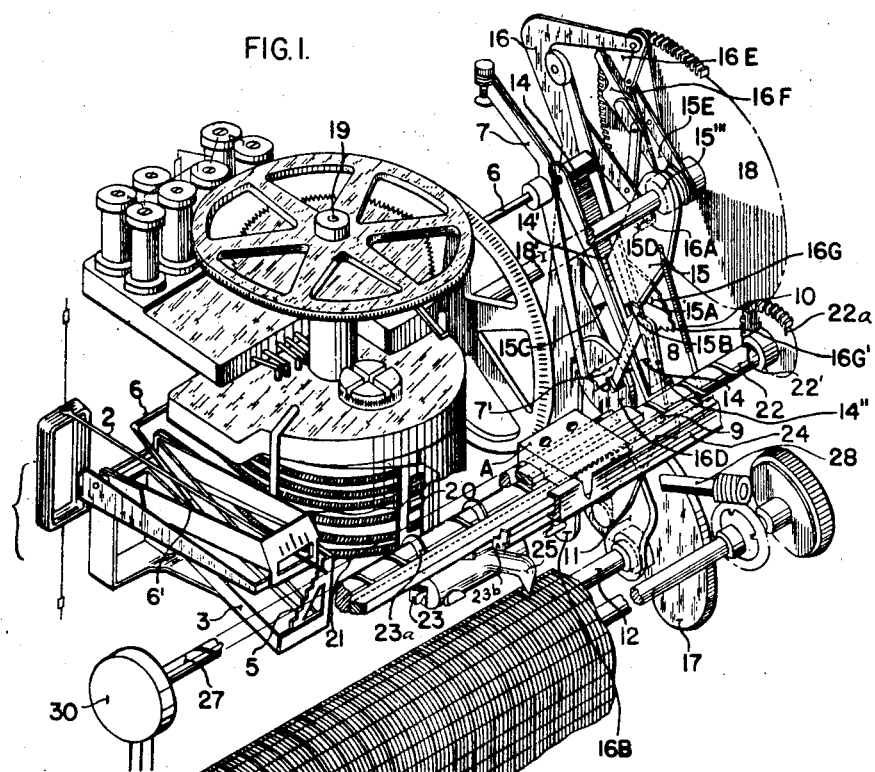
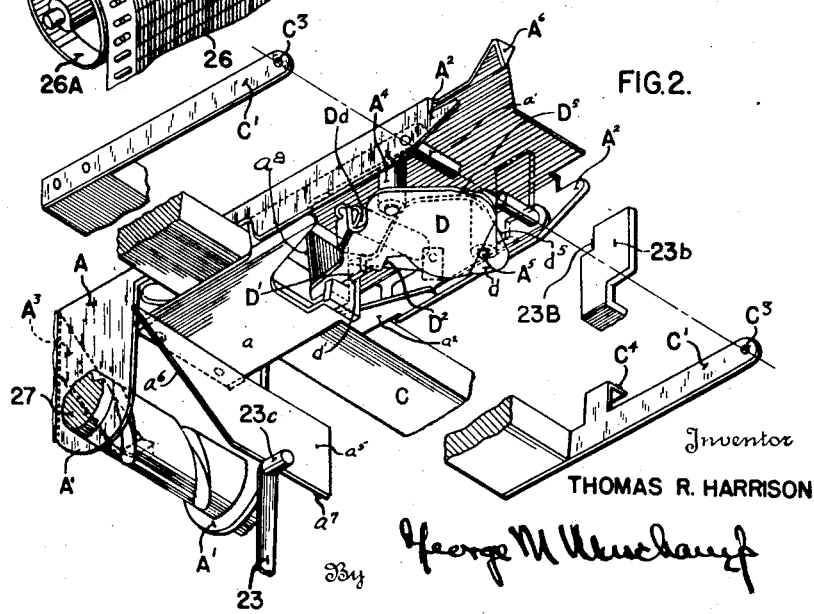
Inventor
THOMAS R. HARRISON
By George M. Merchant
Attorney Aug. 11, 1942. T. R. HARRISON 2,292,937
TIME TEMPERATURE MEASURING INSTRUMENT
Filed Oct. 19, 1938 4 Sheets-Sheet 2
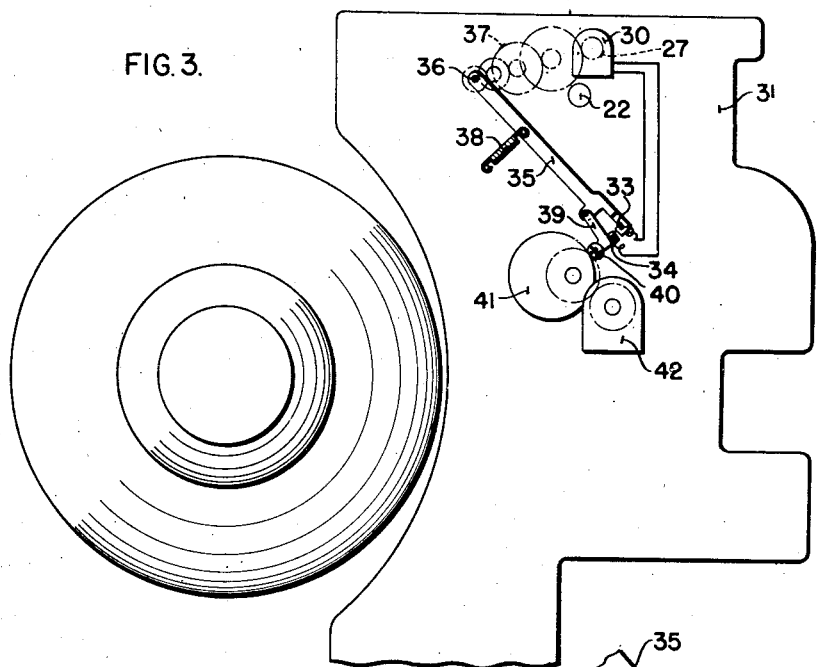
FIG. 3.
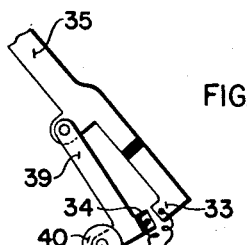
FIG. 4.
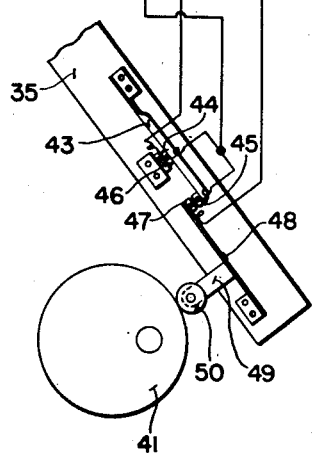
FIG. 5.
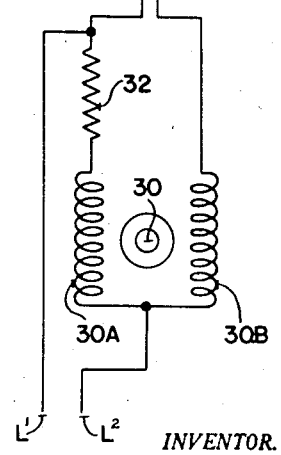
INVENTOR.
THOMAS R. HARRISON
BY George W. Whisenhunt
ATTORNEY Aug. 11, 1942.   T. R. HARRISON   2,292,937
TIME TEMPERATURE MEASURING INSTRUMENT
Filed Oct. 19, 1938   4 Sheets-Sheet 3

*INVENTOR.*
THOMAS R. HARRISON
BY *George W. Winneslauf*
*ATTORNEY*

Aug. 11, 1942. T. R. HARRISON 2,292,937
TIME TEMPERATURE MEASURING INSTRUMENT
Filed Oct. 19, 1938 4 Sheets-Sheet 4
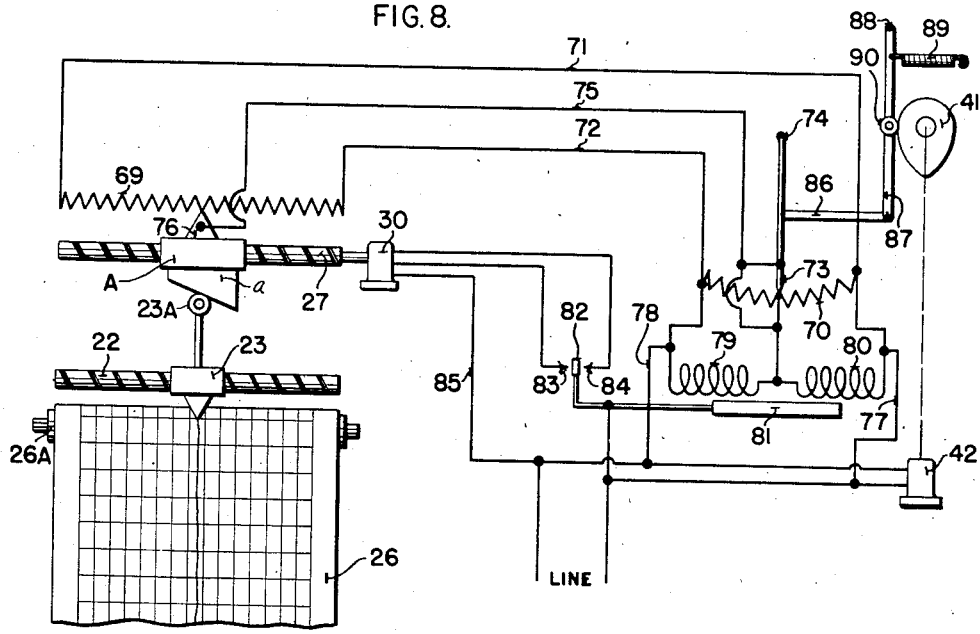
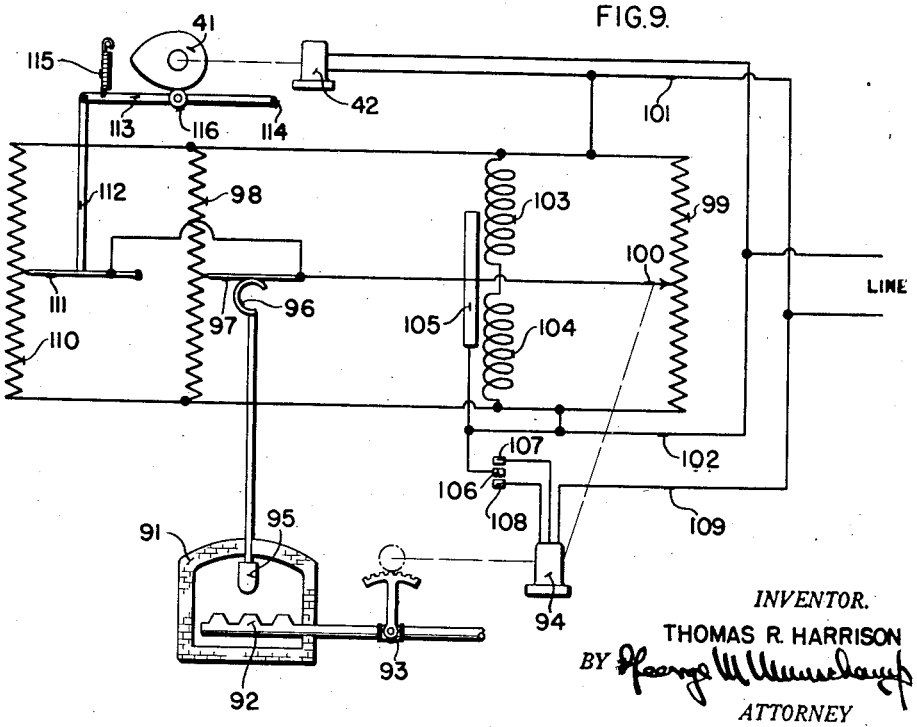
INVENTOR.
THOMAS R. HARRISON
BY *[signature]*
ATTORNEY Patented Aug. 11, 1942

2,292,937

UNITED STATES PATENT OFFICE 2,292,937

TIME TEMPERATURE MEASURING INSTRUMENT

Thomas R. Harrison, Wyncote, Pa., assignor to The Brown Instrument Company, Philadelphia, Pa., a corporation of Pennsylvania Application October 19, 1938, Serial No. 235,817

5 Claims. (Cl. 172—239)

The present invention relates to automatic time cycle control and more particularly to a means for adjusting the control table of a temperature measuring and control instrument in accordance with any desired predetermined time schedule.

In various control instruments there is provided a so-called control table, the position of which determines the desired value of the condition that is to be controlled. Heretofore it has been usual to position this control table by hand, or to move it at a constant speed from one point or another if it was desired to change the value of the condition during any period of time. It is an object of my invention to provide an automatic means to shift the control table of such an instrument automatically from one point to another at any desired rate and to hold it at any given point for a desired period of time, as may be necessary in order to cause the value of the condition to follow a predetermined schedule with respect to time.

To this end I provide a reversible motor to rotate a threaded shaft upon which the control table is mounted, and I provide means to constantly energize the motor for rotation in one direction or the other so that the position of the control table may be changed in accordance with any desired schedule.

The various features of novelty which characterize my invention are pointed out with particularity in the claims annexed to and forming a part of this specification. For a better understanding of the invention, however, its advantages and specific objects obtained with its use, reference should be had to the accompanying drawings and descriptive matter in which I have illustrated and described a preferred embodiment of the invention.

In the drawings:

Fig. 1 is a perspective view of the mechanical relay portion of a potentiometer;

Fig. 2 is a perspective view of a control table showing its locking mechanism;

Fig. 3 is a view of a side plate of the instrument looking from the left of Fig. 1 showing the controls for the control table motor;

Fig. 4 is an enlarged view of the contacts and connections of Fig. 3;

Fig. 5 is a view of a modified type of switching arrangement;

Figure 7:
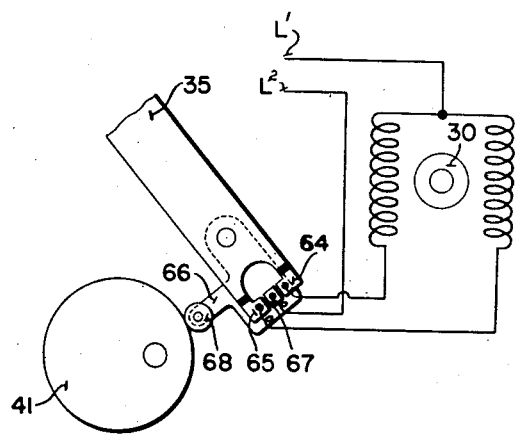

Fig. 7 discloses a still different type of switching arrangement;

Fig. 8 is a view of a modified type of control for the control table motor; and

Fig. 9 is a view of a slightly different form of temperature control mechanism.

The recording potentiometer instrument shown in perspective in Fig. 1, and significant operative parts of which are illustrated in Fig. 1, includes a galvanometer, the pointer 2 of which deflects in response to a condition of unbalance in the potentiometer measuring circuit, which may be any well-known form including the resistance 21 which may be adjusted to rebalance the potentiometer. The instrument also comprises mechanical relay provisions operated by a constantly rotating driving motor (not shown) and controlled by the deflection of the galvanometer pointer 2 away from its normal zero position, to periodically rebalance the potentiometer circuit and move a pen or other recorder carriage 23 along a travelling record strip 26 to record the varying value of the quantity measured on said strip.

In respect to its recording potentiometer functions, the instrument shown is of the form disclosed in Patent No. 1,946,280, dated February 6, 1934, by Thomas R. Harrison, and in respect to the type of control mechanism employed herein, I make use of certain instrumentalities to be later disclosed.

The control provisions which, in their construction and arrangement, and in their combination with the above-mentioned rebalancing and carriage adjusting and control mechanism, constitute the features of the present invention, includes a control table A. The control table is normally stationary but may be adjusted along the path of movement of the carriage 23. The position of the control table along said path corresponds to, and determines the normal value of the quantity being measured, while the position, at any instant, of the carriage 23 corresponds to, and constitutes a measure of the current value of said quantity.

The mechanism of the instrument of Fig. 1 through which the deflection of the galvanometer pointer 2 controls the adjustments of the recorder carriage 23 and the rebalance of the potentiometer circuit on a variation in the quantity or value measured by the galvanometer comprises a pointer engaging and positon gauging element 3. The latter is pivotally supported and, in connection with the hereinafter mentioned shaft 6, has a loading tendency which may well be due partly to spring and partly to gravital action, to turn upward into the position in which one or another of the shoulders 5 of the member 3 engage the pointer 2. The element 3 is engaged by, and turns with the arm 6' of the rock shaft 6. A spring 10 tends to hold a rocker 8, which is journaled on a pivot 9, in the position in which the rocker engages an arm 7 secured to the shaft 6, and thereby holds the latter in a position in which the shoulders 5 are all below the pointer 2.

A cam 11, which is carried by a shaft 12 constantly rotated by the instrument driving motor through a speed reduction gearing, turns the rocker 8 about its pivot against the action of the spring 10, once during each revolution. This allows the arm 7 to turn counter-clockwise, as seen in Fig. 1, until the corresponding angular movement of the shaft 6 is interrupted by the engagement of one or another of the shoulders 5 of the member 3 with the galvanometer pointer 2. The shoulders 5 are so arranged that the turning movement of the shaft 6 and arm 7, thus permitted, will be greater or less according to the deflective position of the pointer 2 at the time. When the arm 7 thus turns counter-clockwise, a lateral projection 7' of that arm engages and turns a secondary pointer element 14 into a position corresponding to the then deflection of the pointer 2. The secondary pointer 14 is loosely journaled on the shaft 6, and has a gravitational loading tendency to turn in the clockwise direction as seen in Fig. 1, so that the arm 14 normally bears against the projection 7' of the arm 7.

At the end of each angular adjustment of the secondary pointer 14 into a position corresponding to the then deflection of the galvanometer 2, one or another of the three shoulders 15A, 15B and 15C of a locking member 15 engages the bottom wall of a slot 14' in the member 14, and thereby frictionally holds the latter in the position occupied by it when such engagement occurs. When the pointers 2 and 14 occupy their neutral positions, the shoulder 15B of the member 15 comes into locking engagement with the member 14. When the galvanometer pointer 2 has deflected to the right as seen in Fig. 1, as it does when the actual value of the quantity measured is lower than that indicated by the previously made and still existing potentiometer adjustment, the secondary pointer 14 is engaged and locked by the shoulder 15C. When the galvanometer pointer deflects in the opposite direction from its neutral position, as it does when the actual value of the quantity measured is higher than that indicated by the existing potentiometer adjustment, the pointer 14 is engaged and locked by the shoulder 15A of the member 15. The locking part 15 is given a tendency to move into locking engagement with the secondary pointer 14 by the spring 10, but is periodically held out of such engagement by the action on its projection 15D of the projection 16A carried by a ratchet lever 16 pivoted at 16B.

A spring gives the lever 16 a tendency to turn forward in the clockwise direction as seen in Fig. 1, but throughout the major portion of each rotation of the shaft 12, the lever 16 is held in a retracted position by a cam 17 carried by said shaft and engaged by the cam follower roll 16D carried by the lever 16. The ratchet lever is operatively connected to two pawls 16E and 16F cooperating with a toothed wheel 18. Each of said pawls have a gravital tendency to occupy a position in which it does not engage the teeth of the wheel 18, but one or the other of the pawls is brought into engagement with the teeth of the wheel on each forward or clockwise movement of the lever 16, if the locking part 15 is then at one side or the other of the intermediate or neutral position which it occupied when the galvanometer pointer 2 is in its neutral position.

The position assumed by the part 15, when in locking engagement with the secondary pointer 14, controls the action of the pawls 16E and 16F by virtue of the fact that the collar or hub portion 15''' of the part 15 carries a spring pawl engaging arm 15E. The movement of the locking part 15 into position in which its shoulder 15A engages the secondary pointer 14 causes the arm 15E to move the pawl 16E into operative engagement with the teeth of the ratchet wheel 18, and the clockwise or forward movement of the ratchet lever 16 then gives a clockwise adjustment to the ratchet wheel. Conversely, when the part 15 moves into the position in which its shoulder 15C engages the secondary pointer 14, the arm 15E shifts the pawl 16F into operative engagement with the wheel 18, and the latter is then adjusted in the counter-clockwise direction.

The extent of the adjustment then given the wheel 18 is made dependent upon the position of the secondary pointer 14, as said position determines which of the various shoulders of an arm 16G carried by the lever 16 shall then engage a projecting portion 14'' of the secondary pointer 14, and thereby arrest the forward movement of the ratchet lever 16. In the neutral position of the galvanometer pointer and secondary pointer 14, the projection 14'' of the latter engages the central shoulder 16G' of the arm 16G and the lever 16 is then held against any operative movement in the clockwise direction. When the secondary pointer position is more or less to one side or the other of its neutral position, the portion 14'' engages an upper or lower shoulder on arm 16G more or less distant from the central shoulder 16G', and the lever 16 is then permitted more or less forward movement.

The rotation of the wheel 18 in one direction or the other effects corresponding potentiometer rebalancing adjustments and position adjustments of the recorder carrier 23. The rebalancing adjustments are affected by means of a rheostat shaft 19 which is geared to the shaft 18' on which the wheel 18 is secured. The rotation of the shaft 19 moves a bridging contact 20 along the convolutions 21 of a potentiometer resistance helically disposed about the axis of the shaft 19, and thereby varies the amount of said resistance in the potentiometer circuit. The resistance adjustments made in response to a deflection of the galvanometer pointer in one direction away from its neutral position rebalances, or tends to rebalance, the potentiometer circuit and thereby returns, or tends to return, the galvanometer pointer to its neutral position.

The rotation of the wheel 18 adjusts the recorder carrier 23 by virtue of the fact that the teeth of the wheel 18 are in mesh with the teeth of a gear 22a carried by a carriage adjusting shaft 22 which is formed with a thread groove 22' of coarse pitch which receives a cam or mutilated screw thread rib secured to the carriage 23, so that the latter is moved longitudinally of the shaft 22 as the latter is rotated.

The marker carriage 23 comprises a frame portion formed of a single piece of sheet metal cut and bent to form a flat underbody portion transverse to and through which the shaft 22 extends, two projections 23b, one at each front corner of said body portion which bear against the inner edge and upper side of the lower flange of a channel bar or rail 24 forming part of the instrument framework, and a projection terminating in roller 23c which extends in a vertical plane transverse to the shaft 22 and rail 24. In addition, the body portion of the carriage frame is provided with a forwardly extending tongue passing beneath the rail 24 and terminating in an uprising pointer or index, adapted to cooperate with a scale fastened to the front face of the rail 24 to indicate the position of the pen carriage and the value of the quantity measured and recorded by the instrument.

The record sheet 26 passes over and is given feeding or advancing movements by a record feedroll 26A. The latter is intermittently rotated by means of a worm and screw connection between the shaft of the roll 26A and a transverse shaft 28. Shaft 28 is intermittently actuated by means of a ratchet and lever device which is engaged and oscillated by an arm on the rocker 8 on each oscillation of the latter.

The control table A of the instrument shown in Figs. 1 and 2 comprises a sheet metal frame having ear portions A′ apertured for the passage of the shaft 27 mounted in the instrument framework alongside the shaft 22, and having bearing parts $A^2$ which engage and slide along the upper flange of the rail 24. To facilitate the adjustment of the control table A along the path of travel of the pen carriage 23, the shaft 27 is shown as formed with a thread groove which is adapted to receive a cam or mutilated thread rib part that may be secured to the control table frame. The shaft 27 may be rotated to adjust the control table in any suitable manner, as by means of a reversible motor 30 geared to the shaft 27. An index may be provided in conjunction with a scale on the front face of the rail 24 to indicate the adjustment of the table and the corresponding normal value of the quantity measured.

A member $a$ is hinged at one edge to the frame of the control table A by a pivot or pintel shaft $a'$ extending parallel to the shaft 27. The member $a$ is formed with guiding provisions including a part $a^2$ for a bar-like part C which extends parallel to the shaft 27 and is rigidly secured at its ends to arms C′ at opposite ends of the instrument which are pivotally connected at $C^3$ to the instrument framework, so that the yoke like structure formed by the bar C and arms C′ may turn with respect to the instrument framework about an axis coinciding with that of the hinge connection $a'$, between the table A and part $a$. The part $a$ and bar C are held by the said guiding provisions against independent turning movements about the axis of their respective pivotal supports. The part $a$ and bar C have a gravitational tendency to move from their highest positions, shown in Fig. 2 counter-clockwise around $a'$ into or toward their lowermost positions. Their movement downward below their last-mentioned positions is prevented by the engagement of a projection $C^4$ from one arm C′ with an adjacent portion of the instrument framework. The extent to which the parts $a$ and C are permitted to swing downwardly from their uppermost positions depends upon the relative positions of the table A and the recorder carriage 23. When the value of the quantity measured is so low that the carriage 23 is entirely at the low side (left-hand side as seen in Fig. 1) of the control table A, the carriage 23 permits movement of the parts $a$ and C to their lowest position. When the current value of the quantity measured is suitably close to the normal value of that quantity, the control table and marker carriage 23 are in such relative positions that downward movement of the hinged part $a$ is prevented or restricted by the engagement of a portion of that part with the marker carriage 23. When an increase in the quantity measured results in a movement of the recorder carriage 23 to the high side of the control table A, that movement causes the part $a$ to be positively secured against down movement from its uppermost position by adjusting a latch member into its latching position. The manner of accomplishing this will now be described.

The part $a$ has a carriage engaging portion $a^5$ secured to it, as shown in Fig. 2, which is formed with an inclined edge $a^6$ and a horizontal edge $a^7$ that is adapted to be engaged by the roller 23c on carriage 23. For a normal value of the quantity being measured, the roller 23c is positioned approximately half way along the inclined edge $a^6$, and as its value becomes lower, the carriage 23 is moved to the left, thus permitting part $a$ and its attached bar C to be lowered around $a'$ as a center. As the value of the measured quantity increases, the carriage 23 moves to the right, thus raising part $a$. A latch D on table A secured the part $a$ in its upper position. The latch D is pivotally mounted on a stud $A^4$ depending from the underside of the plate-like body of the table A. In the latching position of the member D, a finger-like portion of the member extends beneath a portion $a^8$ of that part $a$ which is some distance to the rear of the hinge shaft $a'$.

Latch member D is automatically moved into and out of its latching position, as the carriage 23 moves to and returns from the high side of the control table A, by means which include a vertically disposed shoulder or edge 23b of the projection 23b at the low side front corner of the recorder carriage frame, a member $d$ pivotally mounted on a stud $A^5$ depending from the underside of the control table frame along side the stud $A^4$, and a spring $Dd$ connecting the members D and $d$. The spring $Dd$ tends to move the member D in the counter-clockwise direction, as seen in Fig. 2, and to move the member $d$ in the opposite direction about their respective pivotal supports $A^4$ and $A^5$, such turning movements of the members D and $d$ are prevented by the engagement of the finger portion $d'$ of the part $d$ with the shoulder D′ of the member D, when the latter is in its latching position, as shown in Fig. 2. In the non-latching position of the member D, the finger $d'$ engages a shoulder $D^2$ of the part D.

The members D and $d$ are moved from the latched position shown in Fig. 2 into the unlatched position, and back again into the position shown in Fig. 2 by the engagement of the recorder carriage shoulder 23B with the cam shaped front edges $D^5$ and $d^5$ of the members D and $d$, respectively. The edges $D^5$ and $d^5$ are so respectively shaped and disposed that as the carriage moves to the high side of the control table, the shoulder 23B acts on the edge $d^5$ to turn the member $d$ counter-clockwise, so that the spring $Dd$ may then move the member D into its latching position in which its shoulders D′ engages the finger $d'$. When the carriage 23 subsequently moves back from its high position, the shoulder 23B engages edge D⁵ of the member D and moves the latter into its non-latching position while permitting the spring Dd to move the member d into the position in which its finger d' engages the shoulder D² of the member D and holds the latter in its non-latching position.

The manner in which movement of the part a and bar C with respect to the control table A is used to control the condition to which the galvanometer 2 is responsive may well be similar to that shown in Patent 1,946,280.

As has been previously stated the position of the control table A determines the desired value of the condition and this table is shifted by rotation of shaft 27. The motor 30 which is used to rotate shaft 27 is mounted on the outside of a side plate 31 of the instrument. This side plate 31 is the one which is mounted on the left end of the instrument as shown in Fig. 1.

Energization of the motor 30 for rotation in either direction in order to shift the control table according to a predetermined schedule may be accomplished in a number of ways. As shown in Figs. 3 and 4 the motor 30 has a weak field 30A that is normally energized through line L¹, resistance 32, and line L², and a strong field 30B, which when energized will drive the motor in a direction opposite to that in which field 30A will drive it. The field 30B is energized when the two contacts 33 and 34 are closed in accordance with the schedule to be followed. The contact 33 is mounted on the lower end of and insulated from an arc 35 which is attached to for movement with a shaft 36 that is journaled in the side plate 31. The shaft 36 is connected by reduction gearing 37 to motor 30 in such a fashion that the motor may rotate through enough revolutions to shift control table A from one end to the other of the control range of the instrument and still only move the arm 35 through an arc large enough to correspond with the size of the time schedule cam. A spring 38 is provided to bias the arm 35 in one direction in order to take up any back-lash in the gearing 37. The contact 34 is mounted on a lever 39 that is pivoted to the lower end of arm 35, the lever also being provided with a cam roller 40 that leans against a cam 41. The cam 41 is the time schedule cam and may be formed to provide any desired movement of the control table A. A motor 42, also mounted on the side plate 31 is used to drive the cam 41 at constant speed.

In the operation of this embodiment of the invention the normally energized field 30A of motor 31 tends at all times to rotate shaft 37 in one direction to shift the control table A and at the same time to move arm 35 in a clockwise direction to bring contacts 33 and 34 together. When those contacts engage the strong field 30B is energized so that the motor 30 will rotate the shaft 37 in the other direction and move the arm 35 counter-clockwise until the contacts 33 and 34 are disengaged, when the cycle is repeated. As the cam 41 is rotated the lever 39 will, by means of its roller 40, move independently of the arm 35 and follow the contour of the cam. This, depending upon whether the cam surface is rising or falling, will cause the contacts 33 and 34 to remain closed or open for a longer period than normal and thereby cause the control table A to be shifted in accordance with the contour of cam 41. In this manner the control table can be moved to any position along its path at any speed within the limits of the machine by properly shaping the cam 41. A rising surface on the cam will cause the motor to move the control table in one direction while a falling surface of the cam 41 will cause the motor 30 to move the control table in the other direction. If the surface of the cam is concentric with its center the contacts 33 and 34 will merely vibrate without rotation of the motor and the control table will remain stationary.

There is shown in Fig. 5 another type of switch that may be used to control the motor 30, which is in this case provided with fields 30C and 30D of equal strength. Mounted on the arm 35 is an elongated member 43 of spring metal which carries a pair of contacts 44 and 45, the former of which is normally in engagement with a contact 46, also attached to the arm 35. The contact 45 is adapted to engage a contact 47 that is in the end of a spring metal strip 48 attached to the lower end of arm 35. All of the contacts are insulated from arm 35 and the contacts 44 and 45 are connected directly to one side of the line L, while contacts 46 and 47 are each connected to one of the fields 30C or 30D and from there to the other side of the line L². The member 48 has a projection 49 carrying a roller 50 that is in engagement with the time schedule cam 41.

In the operation of this embodimentt of the invention contacts 44—46 and 45—47 are normally closed, energizing both fields 30C and 30D of the motor 30 whereby the latter is stalled on a movement of cam 41 permitting arm 48 to carry contact 45 away from contact 47 field 30D will be deenergized causing the motor under the action of field 30C to move arm 35 clockwise until contacts 45 and 47 are engaged again stalling the motor. On a movement of cam 41 in a direction to move arm 48 clockwise about its spring pivot, spring arm 43 will be forced counter-clockwise disengaging contacts 44 and 46 and permitting motor 30 to rotate arm 35 counter-clockwise until contacts 44—46 reengage stalling the motor. As in the embodiment of Figs. 3 and 4 the cam 41 is rotated at a constant speed and as its contour varies with respect to the roller 50 the time that the pairs of contacts are in engagement will vary so that motor 30 will rotate shaft 27 and shift the control table in accordance with the desired schedule, as determined by the contour of cam 41.

Figure 6:
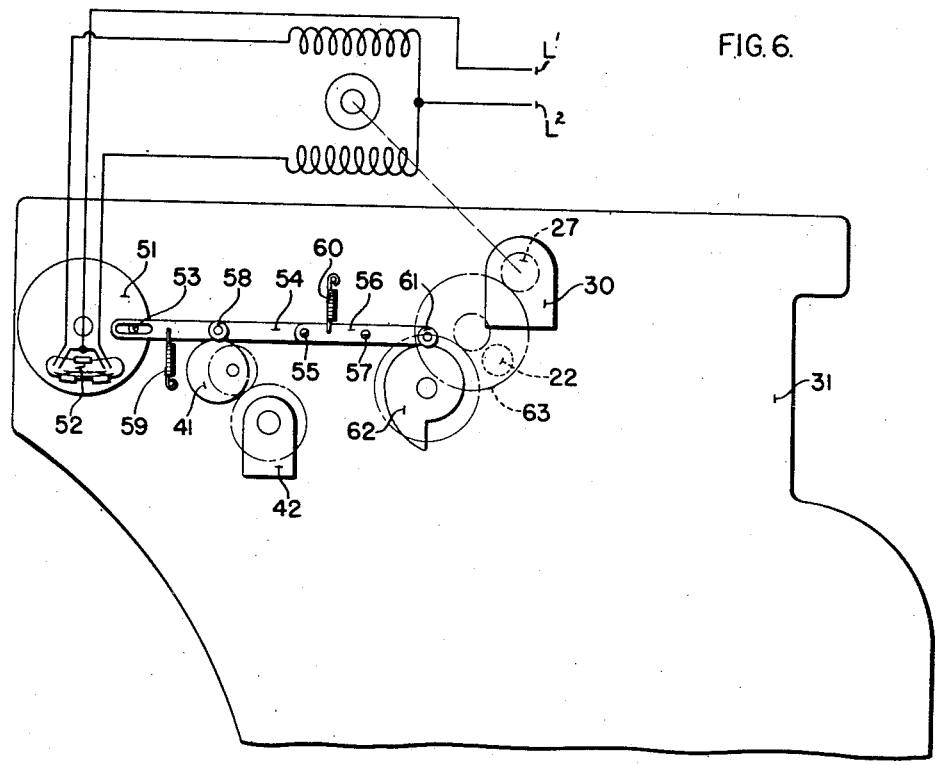
Fig. 6 is a view similar to Fig. 3 showing a different type of switching arrangement.

An embodiment of the invention using a mercury switch instead of the previously described open types of switches is disclosed in Fig. 6. A disc 51 is pivoted on the side-plate 31 and has mounted on it a double-throw mercury switch 52 that has a pair of contacts in each end. One contact of each pair is connected to the line L, while the other contact of each pair is connected respectively to one field of motor 30 and from there to the line L². The motor 30 in this case has fields of equal strength and will rotate in one direction or the other depending upon which field is energized. The disc 51 also has a pin 53 projecting from it that is received in a slot in one end of a lever 54 that has its other end pivoted at 55 to a lever 56 which is pivoted at 57. The lever 54 has a cam roller 58 in its center which bears on the time schedule cam 41 and is biased around its pivot point 55 to bring the roller 58 into engagement with the cam 41 by a spring 59. The lever 56 is biased in a clockwise direction by a spring 60 to bring a roller 61 on its right end into engagement with a cam 62 that is driven through suitable reduction gearing 63 from motor 30.

In the operation of this embodiment of the invention rotation of cam 41 will raise or lower roller 58 and move the lever 54 around its pivot 55 to cause the slot in the left end of lever 54 to move pin 53 and disc 51 to close the contacts in one end or the other of switch 52. If, for example, the cam 41 is rotating clockwise roller 58 will be raised to rotate disc 51 counter-clockwise and close the contacts in the left end of switch 52. This will energize one field of motor 30 to cause it to rotate shaft 27 and shift the control table A in the proper direction. At the same time the motor 30 will rotate cam 62 counter-clockwise and permit the roller 61 to be lowered under the force of spring 60, thus raising the pivot point 55 of lever 54. As point 55 rises the spring 59 will move lever 54 counter-clockwise around roller 58 as a fulcrum to lower the left end of the lever and thus rotate disc 51 clockwise to open the switch 52 and stop motor 30. If the edge of cam 41 is falling with respect to roller 58, the operation of the device will be opposite to that just described. From the above description it will be seen that the cam 41 causes energization of motor 30 in a direction to properly position the control table A and movement of the motor will also give a follow-up action to open the motor switches 52 when the control table has moved to its correct position. By varying the shape of cam 41 any desired speed of movement of the control table may be obtained and thus any change in the value of the condition being controlled may be obtained.

In Fig. 7 there is shown another type of switch that may be used in connection with the arrangement of Fig. 3. When using this type of switch the motor 30 is provided with fields of equal strength that are connected at one side to one side of the line L¹ and connected at their other sides respectively to contacts 64 and 65 that are mounted on and insulated from the lower end of the arm 35. Pivotally mounted on the lower end of the arm 35 is a member 66 that is provided with a contact member 67 which is connected to the other side of the line L² and that is also provided with a laterally extending projection upon which is mounted a cam following roller 68.

In the operation of this switch the contact 67 is normally disengaged from both contacts 64—65 and the motor fields are both open. When cam 41 urges contact 67 into engagement with contact 65 motor 30 will rotate in a direction to move arm 35 in a clockwise direction and when contacts 64 and 67 are in engagement the motor 30 will be energized for rotation in the other direction. In either case the follow-up action of arm 35 eventually disengages the engaged contact and simultaneously motor 30 will shift the control table A along its path in correspondence to the contour of the cam 41.

It will be clear, therefore that I have provided an open contacting device in Fig. 4 which is of the nascent or vibratory type, an open contact device in Fig. 5 for normally energized field type motor and an open contact device in Fig. 6 for a normally deenergized field type motor. Obviously the mercury switch device of Fig. 6 may be used for either the normally energized or normally deenergized type motor by using a switch which is respectively normally closed or normally open. By using the mercury switch of Fig. 6 in the circuit of Fig. 4 eliminating the use of one side contact of the switch the operation of the device of Fig. 6 motor may be attained with the enclosed switch.

In each of the above desired forms of the invention the speed at which the motor 30 shifts the control table A and gives a follow-up movement to the arm 35 is dependent upon the steepness of the surface of cam 41 with respect to its follower. If the slope of the cam is long the movable contact will keep ahead of the following contact on arm 35 and the motor 30 will run at its full speed. If, however, the slope of the cam 41 is not so steep the motor 30 will have a tendency to rotate in a series of small steps and thereby move the control table A along its path at a slower speed.

The embodiment of the invention disclosed in Fig. 8 differs from that of the previous figures only in the manner in which the motor 30 is energized to rotate shaft 27 and shift the control table A along the chart. In this embodiment instead of the open or mercury type of switch for the motor 30, the motor is energized as the result of the unbalance of a bridge circuit, which unbalance is carried out in accordance with a predetermined schedule by the cam 41.

In this embodiment of the invention a resistance 69 mounted on the potentiometer parallel with the shaft 27 and a resistance 70 are provided which resistances are connected in parallel by conductors 71 and 72. The resistance 70 is engaged by a contact 73 that is on a lever pivoted to move around point 74 which contact is connected by conductor 75 to a contact 76 that is mounted on the control table A and engages the resistance 69. The two resistances 69 and 70 as divided by contacts 73 and 76 form the arms of a bridge circuit which is energized by conductors 77 and 78 extending to the line. Connected across the bridge are the coils 79 and 80 which have associated with them an armature 81 that has attached to, for movement with it, a contact 82 that is connected to one side of the line. The contact 82 is adapted to engage either of contacts 83 or 84 which are respectively connected to one field of motor 30. A conductor 85 extends from the motor to the other side of the line.

The contact 73 is moved across the resistance 70 by means of a link 86 that is attached at one end to the contact and at its other end to a lever 87 that is pivoted at 88 and biased in a counter-clockwise direction by a spring 89. The lever 88 is provided intermediate its ends with a roller 90 that bears on a constantly rotating cam 41 driven from the constant speed motor 42.

In the operation of the embodiment, the cam 41 is shaped to give the schedule of the condition which it is desired to maintain. Then as it is rotated by the motor 42, contact 73 will be shifted along the resistance 70 in accordance therewith. Movement of the contact 73 unbalances the bridge circuit and changes the current flow through the coils 79 and 80 to shift armature 81 in a manner to bring contact 82 into engagement with either contact 83 or 84, depending upon the direction of unbalance of the bridge. The motor 30 is then energized to rotate shaft 27 and shift the control table A according to schedule. As the control table moves the contact 76 attached thereto is moved along the resistance 69 in a direction which tends to rebalance the bridge and thereby equalize the current flow through the coils 79 and 80 to disengage contact 82 from the contact 83 or 84. This will stop motor 30 to prevent the control table from moving too far. The value of the condition is controlled in accordance with the relative positions of the parts $a$ and roller 23C as was described in detail in connection with the description of the relay mechanism of Figures 1 and 2.

Another mechanism for controlling the value of a condition in accordance with a predetermined time schedule is shown in Fig. 9. In this embodiment of the invention furnace 91 is shown as being heated from a liquid fluid burner 92, the supply of fuel being regulated by a motor driven valve 93 that is in turn adjusted by reversible motor 94. In this case the temperature of the furnace is shown as being measured by a thermometer system comprising a bulb 95 in the furnace that is connected by suitable tubing to a Bourdon tube, 96 or a similar expansible member. The system is filled with a temperature responsive material so that as the temperature of the furnace 91 increases the tube 96 will expand and move a contact 97 upwardly along a resistance 98. The ends of the resistance 98 are connected to the ends of a resistance 99 and the contact 97 is connected to a contact 100 which is movable along the resistance 99. The resistance 98 and 99 is divided by the contacts 97 and 100 from the arms of a bridge circuit that is energized from a suitable source of electric current by the conductors 101 and 102.

Connected across the bridge is a pair of coils 103 and 104 that have associated with them an armature 105 that is responsive to the current flow through the coils and which has a contact 106 on its lower end. The contact 106 is connected to the conductor 102 and is adapted to engage either one of the contacts 107 or 108 that are each connected to a field of the reversible motor 94. The motor is connected by a conductor 109 to conductor 101 and the other side of the line.

As the temperature of the furnace 91 changes the tube 96 will change in size and move the contact 97 along resistance 98 to unbalance the bridge circuit. This will change the current flow through coils 103 and 104 and shift the armature 105 to move contact 106 into engagement with either contacts 107 or 108, depending upon the direction of deviation of the temperature. Accordingly the motor 94 will be energized to rotate in a direction to adjust valve 93 so that the fuel for the burner 92 will be increased or diminished, as necessary. This same rotation of the motor is used to shift contact 100 along the resistance 99 in a direction to balance the bridge.

The above normal operation of the bridge is modified in order that the temperature of the furnace may be varied according to a schedule by adding a third resistance 110 to the bridge circuit in parallel with the resistances 98 and 99. A contact 111, connected to the contacts 97 and 100, is movable along the resistance 110 and is moved by a link 112 that has one end attached to the contact and its other end attached to a lever 113 that is pivoted at 114 and is biased in a clockwise direction by a spring 115. The lever 113 has a roller 116 on it that normally bears against the edge of the cam 41 which is rotated at a constant speed by the motor 42.

The cam 41 is shaped to give the schedule of temperature to the furnace 91 which it is desired to maintain. Then as the contact 111 is moved along the resistance 110, in accordance with the shape of the cam, it unbalances the bridge. This also varies the current flow through coils 103 and 104 to cause movement of armature 105 and energization of motor 94. In a manner above described the motor 94 will adjust the fuel valve 93 and will adjust contact 100 along the resistance 99 to rebalance the bridge. Any change in temperature of the furnace 91, not according to schedule, as indicated by the position of the contact 97 along the resistance 98 will either tend to increase the unbalance of the bridge or nullify it, according to the direction of the change. This will accordingly energize motor 94 in the proper direction to rebalance the bridge and adjust the fuel valve 93 in the proper direction to maintain the temperature of the furnace at the desired point.

From the above description it will be apparent that I have devised a means for obtaining an automatic time cycle control in a measuring and control instrument of the type in which the position of a control table determines the value at which a condition is to be controlled. By driving a motor that controls the position of the control table in accordance with the contour of a cam shaped for the schedule to be maintained the usefulness of the instrument is greatly increased. The cams, of course, can be shaped as desired, and because they are mounted on the outside of a side plate of the instrument are readily accessible for changing.

While in accordance with the provisions of the statutes, I have illustrated and described the best form of my invention now known to me, it will be apparent to those skilled in the art that changes may be made in the form of the apparatus disclosed without departing from the spirit of my invention as set forth in the appended claims and that in some cases certain features of my invention may sometime be used to advantage without a corresponding use of other features.

Having now described my invention, what I claim as new and desire to secure by Letters Patent is:

1. In combination with a measuring and control instrument, a reversible motor, a lever geared to and movable by said motor, a member pivoted to said lever, a pair of cooperating contacts on said lever and member in said motor circuit adapted when closed to energize said motor for rotation in one direction, means normally energizing said motor for rotation in the opposite direction and means to close said contacts in accordance with a predetermined schedule.

2. In combination with a measuring and control instrument, a reversible motor, a lever geared thereto for movement in response to rotation thereof, pairs of contacts carried by said lever, rotation of the motor in one direction opening one pair of contacts and in the opposite direction opening the other pair, and a constantly rotating cam shaped in accordance with a predetermined schedule controlling the time of closure of said pairs of contacts.

3. In a measuring and control instrument including measuring means responsive to the value of a condition and control means for controlling the condition, comprising means controlled by the measuring means and a control point adjusting member movable to a position corresponding to the value at which said condition is to be maintained by said instrument, in combination therewith, a motor for positioning said control point adjusting member, time operated cam means having a contour shaped in accordance with a desired time-condition schedule, means operated by said cam means for controlling said motor, and means movable by said motor in proportion to the movement of said control point adjusting member for also controlling said motor to position said control point adjusting member in accordance with the time-condition schedule of said time operated cam means.

4. In a measuring and control instrument including measuring means responsive to the value of a condition, and control means for controlling said condition, including a control point adjusting member movable to a position corresponding to the value at which said condition is to be maintained by said instrument, in combination therewith a motor for positioning said control point adjusting member, time operated cam means having a contour shaped in accordance with a desired time-condition schedule, a lever geared to said motor and movable therewith in proportion to the movement of said control point adjusting member, cooperating motor controlling contacts carried by said lever, some of said contacts being movable relative thereto, cooperation of said movable contacts with the remaining contacts to control the motor being regulated by said cam.

5. In a measuring and control instrument including measuring means responsibe to the value of a condition, and control means for controlling said condition, including a control point adjusting member movable to a position corresponding to the value at which said condition is to be maintained by said instrument, in combination therewith, a motor for positioning said control point adjusting member, time operated cam means having a contour shaped in accordance with a desired time-condition schedule, cooperating contacts to control the operation of said motor, and means respectively moved by said motor in proportion to the movement imparted to said control point adjusting member and by said cam to cause said contacts to cooperate and produce rotation of said motor, said means also operating to separate said contacts to stop said motor.

THOMAS R. HARRISON.